(12) United States Patent
Edward

(10) Patent No.: US 9,266,420 B2
(45) Date of Patent: Feb. 23, 2016

(54) HYDROSTATIC DRIVE

(71) Applicant: Robert Bosch GmbH, Stuttgart (DE)

(72) Inventor: Iain Edward, Fife (GB)

(73) Assignee: Robert Bosch GmbH, Stuttgart (DE)

(*) Notice: Subject to any disclaimer, the term of this patent is extended or adjusted under 35 U.S.C. 154(b) by 505 days.

(21) Appl. No.: 13/666,205

(22) Filed: Nov. 1, 2012

(65) Prior Publication Data

US 2013/0111893 A1    May 9, 2013

(30) Foreign Application Priority Data

Nov. 4, 2011    (DE) .................. 10 2011 117 652

(51) Int. Cl.
| | |
|---|---|
| *B60K 7/00* | (2006.01) |
| *B60K 17/10* | (2006.01) |
| *B60K 17/356* | (2006.01) |
| *F16H 61/4035* | (2010.01) |
| *F16H 61/456* | (2010.01) |
| *F15B 7/00* | (2006.01) |

(52) U.S. Cl.
CPC ............... *B60K 7/0015* (2013.01); *B60K 17/10* (2013.01); *B60K 17/356* (2013.01); *F15B 7/003* (2013.01); *F15B 7/006* (2013.01); *F15B 7/008* (2013.01); *F16H 61/4035* (2013.01); *F16H 61/456* (2013.01); *F15B 2211/20561* (2013.01); *F15B 2211/4053* (2013.01); *F15B 2211/40523* (2013.01); *F15B 2211/40538* (2013.01); *F15B 2211/7058* (2013.01); *F15B 2211/7121* (2013.01)

(58) Field of Classification Search
CPC ... B60K 17/10; F16H 2039/005; F16H 39/02; F16H 61/4017; F16H 61/456
USPC .................. 60/430, 468, 484, 488
See application file for complete search history.

(56) References Cited

U.S. PATENT DOCUMENTS

| | | | | |
|---|---|---|---|---|
| 3,590,688 | A | * | 7/1971 | Brannon .................... 91/516 |
| 3,841,423 | A | * | 10/1974 | Holtkamp et al. .............. 180/6.3 |
| 3,900,075 | A | * | 8/1975 | Chichester ........... B60K 17/356 60/486 |
| 3,910,396 | A |  | 10/1975 | Eischen et al. |
| 4,914,592 | A | * | 4/1990 | Callahan et al. ................. 701/41 |
| 5,647,211 | A | * | 7/1997 | Harber et al. .................... 60/484 |
| 6,922,992 | B1 | * | 8/2005 | Morgan .......................... 60/484 |
| 6,991,058 | B2 | * | 1/2006 | Cousin et al. ................. 180/242 |
| 7,757,487 | B2 | * | 7/2010 | Smith ............................. 60/484 |
| 7,770,685 | B2 | * | 8/2010 | Irwin et al. ..................... 180/308 |
| 2004/0216456 | A1 | * | 11/2004 | Cousin et al. .................... 60/485 |

FOREIGN PATENT DOCUMENTS

| | | |
|---|---|---|
| DE | 31 17 815 A1 | 7/1983 |
| DE | 34 01 754 A1 | 8/1984 |

(Continued)

OTHER PUBLICATIONS

Frankenfield, Tom. "Using Industrial Hydraulics" Rexroth Worldwide Hydraulics—Hydraulics and Pneumatics Magazine, Second Edition, 1984, pp. 32 and 6-53 to 6-55 (6 pp).

*Primary Examiner* — Thomas E Lazo
(74) *Attorney, Agent, or Firm* — Maginot, Moore & Beck LLP

(57) ABSTRACT

A hydrostatic drive includes a hydraulic pump configured to drive at least two hydraulic motors. The hydraulic motors each include an inlet side and an outlet side. The hydraulic motors are each connected on the inlet side to a respective outlet of a flow divider, which is arranged downstream of the hydraulic pump. The hydraulic motors are each connected on the outlet side to a respective inlet of a flow divider, which is arranged upstream of the hydraulic pump.

17 Claims, 3 Drawing Sheets

FOREIGN PATENT DOCUMENTS

| | | |
|---|---|---|
| DE | 195 31 397 A1 | 2/1997 |
| DE | 10 2005 005 555 A1 | 8/2005 |
| DE | 10 2006 058 802 A1 | 6/2008 |
| EP | 0 547 947 A1 | 6/1993 |
| EP | 1 420 973 | 5/2004 |

* cited by examiner

HYDROSTATIC DRIVE

This application claims priority under 35 U.S.C. §119 to patent application no. DE 10 2011 117 652.0, filed on Nov. 4, 2011 in Germany, the disclosure of which is incorporated herein by reference in its entirety.

BACKGROUND

This disclosure is related to a hydrostatic drive according to the description below.

Hydrostatic drives are used, in particular, as traction drives and can have a plurality of hydraulic motors in order to be able to drive a plurality of axles or a plurality of wheels individually.

In order to prevent a wheel slipping when there is deficient traction or in order to bring about synchronization of the rotational speeds of the individual wheels, it is known to connect hydraulic motors of two wheels in series, i.e. to connect the pressure medium outlet of the first hydraulic motor to the pressure medium inlet of the second hydraulic motor via a coupling line. If the swept volumes of the hydraulic motors are the same, the same rotational speed occurs at both hydraulic motors since both hydraulic motors deliver the same pressure medium flow.

If, for example, a wheel which is connected to the first hydraulic motor slips owing to deficient traction, the excess torque at this hydraulic motor is transmitted via the coupling line to the second hydraulic motor. The first hydraulic motor is, as a result, "supported" on the second hydraulic motor insofar as the traction at the wheel of the second hydraulic motor is sufficient for this. The torque is transmitted from the slipping wheel to the wheel with traction. With this solution, comparatively little driving torque is lost from the traction drive owing to the slipping of a wheel.

The series connection can be referred to as a lock. In the case of the transverse lock, the hydraulic motors of two wheels of one axle are connected in series, and in the case of the longitudinal lock the hydraulic motors of two wheels of a drive chain or of various axles are connected in series.

Drive concepts of hydraulic motors which are connected in series have a relatively poor efficiency level compared with hydraulic motors which are connected in parallel. A cause is relatively small pressure differences which occur at the hydraulic motors which are connected in series. High pressure is applied to the pressure medium inlet of a first, upstream hydraulic motor, and the pressure medium outlet of the downstream hydraulic motor is assigned to the low pressure. In the coupling line between these two hydraulic motors a pressure of medium level occurs, referred to as the "back pressure". As a result, both hydraulic motors have a relatively small pressure difference between their pressure medium inlet and pressure medium outlet compared to the parallel connection, which leads to an overall lower total torque of the traction drive. The efficiency level of the drive is therefore reduced compared to the parallel connection.

Since severely degraded traction conditions occur only comparatively rarely, for example during offroad use or in the winter, it is advantageous generally to limit the drive energy to just one wheel or to just one axle, and to connect a further wheel or a further axle only in the case of deficient traction.

This is taken up by DE 10 2006 058 802 A1 in order to improve the total efficiency level, said document presenting a hydrostatic multi-motor drive with single hydraulic motors, and in which document hydraulic motors which are located downstream and are connected in series can be switched into the idling mode by means of a bypass line, a valve unit and a minimum pressure holding device. The minimum pressure holding device brings about here a comparatively low pressure at the pressure medium input of the downstream hydraulic motor in the idling mode, with the result that said hydraulic motor only has a low driving power which is of just such a magnitude that its self-locking is overcome. A disadvantage with this solution is that the efficiency level continues to be reduced in the four-wheel operating mode.

EP 0 547 947 B1 presents a hydrostatic traction drive having two axles on which in each case two wheels of hydraulic motors are driven. The wheels of the one axle are driven here in each case by a double hydraulic motor, and the wheels of the other axle by a single hydraulic motor. The double hydraulic motors are arranged hydraulically in parallel here, wherein one of the hydraulic motors of the double hydraulic motors is connected in series with a respective single hydraulic motor of the other axle. The double hydraulic motors each have two groups of hydrostatic working spaces which are mechanically coupled. Each of the groups has a pressure medium inlet and pressure medium outlet. As a result it is possible to divide the (swept) volume of the double hydraulic motors and actually connect one of these hydraulic motors hydraulically in series with a single hydraulic motor. When slip occurs at a wheel, traction of the traction drive is at least partially maintained owing to the hydraulically mutually supporting hydraulic motors. However, spinning of the wheels is possible if the pressure medium which drives the hydraulic motors flows out via pressure limiting valves when slip occurs.

EP 1 420 973 B1 discloses a hydrostatic traction drive in which four wheels are provided, wherein a respective wheel is driven with double hydraulic motors. A respective hydraulic motor of the double hydraulic motors is then connected in series with a respective other hydraulic motor of another double hydraulic motor.

A disadvantage with these solutions is that the arrangement and hydraulic connection of double hydraulic motors is extremely costly in terms of apparatus.

In contrast, the disclosure is based on the object of providing a hydrostatic drive which is of simple configuration in terms of apparatus, substantially prevents, as a traction drive, spinning of individual wheels or of a plurality of wheels, and at least partially maintains traction when individual wheels or a plurality of wheels spin. This object is achieved by a hydrostatic drive according to the features described below.

SUMMARY

According to the disclosure, a hydrostatic drive, in particular a traction drive, a hydraulic pump as a pressure medium source with which at least two consumers are driven, in particular hydraulic motors which are connected to, in each case, one wheel of a vehicle, in particular in a closed hydraulic circuit. Provided downstream of the hydraulic pump is a flow divider which divides a pressure medium volume flow, delivered by the hydraulic pump, into two partial flows. A respective outlet of the flow divider is connected here to a respective inlet of a hydraulic motor, as a result of which a respective hydraulic motor is supplied with a predetermined partial volume flow independently of the load pressure. Provided downstream of the hydraulic motors and upstream of the hydraulic pump is a further flow divider which adds together the partial volume flows of the hydraulic motors. For this purpose, a respective inlet of the further flow divider is connected to an outlet of a respective hydraulic motor. The hydraulic pump can be pivotable here, wherein the flow dividers are then each configured in such a way that they can operate both in the adding operating state and in the dividing operating state.

This solution has the advantage that, for example in the case of slipping of one of the wheels which are driven by the hydraulic motors, the partial volume flows of the hydraulic motors are maintained by the flow dividers, as a result of which spinning of the hydraulic motors is avoided with low expenditure on apparatus.

Various advantageous developments of the disclosure are the subject matter of further description below.

In a further refinement of the disclosure, three hydraulic motors are provided. The further hydraulic motor shares here an outlet of the flow divider, which is arranged downstream of the hydraulic pump with one of the hydraulic motors, and shares an inlet of the flow divider, which is arranged upstream of the hydraulic pump with the respective other hydraulic motor. As a result of this arrangement, in the event of slipping of a wheel which is driven by the hydraulic motors which share an outlet of the flow divider, the partial volume flows which flow through these hydraulic motors are maintained to the maximum extent, as a result of which spinning of the hydraulic motor which drives the slipping wheel is prevented with low expenditure on apparatus. Furthermore, this at least partially maintains traction of the drive. In contrast to this, in the prior art, for example in EP 0547 947 B1, double hydraulic motors which are extremely complex in terms of apparatus are necessary, in which double hydraulic motors in each case one hydraulic motor of a double hydraulic motor is connected in series with a single hydraulic motor. Since the drive according to the disclosure does not have double hydraulic motors in which a respective hydraulic motor is connected in series with a single hydraulic motor, the total cubic capacity of its hydraulic motors is lower given the same power. Furthermore, a relatively small number of pressure lines are necessary for connecting the hydraulic motors in the case of the drive according to the disclosure, as a result of which expenditure on mounting is greatly reduced. Furthermore, the efficiency level during starting and during operation of the drive is improved compared to the prior art with a series connection.

The drive advantageously has four hydraulic motors, wherein in each case two hydraulic motors share an outlet of the flow divider, which is arranged downstream of the hydraulic pump. The hydraulic motors which share an outlet are then connected on the outlet side to different inlets of the flow divider, which is arranged upstream of the hydraulic pump. The hydraulic motors are therefore divided diagonally. This solution has the advantage that in the case of slipping of, for example, one or two wheels driven by the hydraulic motors, traction is at least partially maintained owing to the pressure conditions which occur in the hydrostatic drive owing to the slip. The traction is then maintained by the hydraulic motors which drive the wheels without slip. If a load pressure of the hydraulic motors before the slip is at maximum half the maximum system pressure, which is limited, for example, by pressure limiting valves, the traction can even be completely maintained by the pressure conditions which occur.

In order to limit a system pressure of a hydrostatic drive, in each case a pressure limiting valve, which opens into a tank, is connected between a respective outlet of the flow divider, which is arranged downstream of the hydraulic pump, and the hydraulic motors which are connected to said flow divider, and between a respective inlet of the flow divider, which is arranged upstream of the hydraulic pump, and the hydraulic motors which are connected to said flow divider.

In order to supply the hydrostatic drive with additional pressure medium, a feed pump is provided. With the latter it is possible to deliver pressure medium from a tank into the hydraulic circuit via feed lines. A respective feed line is connected here via a replenishing valve or nonreturn valve, which opens in the pressure medium flow direction away from the feed pump, between a respective outlet of the flow divider, which is arranged downstream of the hydraulic pump, and the hydraulic motors which are connected to said flow divider, and between a respective inlet of the flow divider, which is arranged upstream of the hydraulic pump, and the hydraulic motors which are connected to said flow divider.

In order to bypass one or both flow dividers, a bypass valve can be arranged parallel to said flow divider, with which bypass valve a direct pressure medium connection between the hydraulic pump and the hydraulic motors can be controlled.

A valve slider of a respective bypass valve can easily be acted on in the direction of its open position by the pressure medium between the replenishing valve and the feed pump, and in the direction of its closed position by a spring force of a valve spring. The feed pump can be driven here by the hydraulic pump of the drive, wherein a pivoting unit of the hydraulic pump then sets, in a customary fashion, a pivoting angle as a function of the pressure which occurs between the replenishing valve and the feed pump.

Alternatively, the valve slider of a respective bypass valve can be acted on in the direction of its closed position with an adjustment force of an electric actuator, and in the direction of its open position by a spring force of a valve spring.

A switch for switching the electric actuator on and off can advantageously be provided. The switch can then be activated, for example at a specific pivoting angle of a gas pedal of an engine which drives the hydraulic pump, in particular an internal combustion engine, as a result of which in the case of activation the actuator is then switched on or off. As a result, the flow dividers are therefore switched on or off at a predetermined position of the gas pedal of the engine which drives the hydraulic pump. Alternatively or additionally, the activation of the switch can occur as a function of the pivoting angle of a steering cylinder of a steering system of a vehicle which has the hydrostatic drive.

For example a hydraulic flow dividing valve, a hydraulic external gear machine or a load-pressure-independent flow distribution controller can be provided as flow divider.

The hydraulic pump can advantageously be of pivoting configuration in order to reverse a direction of rotation of the hydraulic motors, wherein a respective flow divider can be used both in the adding operating state and in the dividing operating state.

BRIEF DESCRIPTION OF THE DRAWINGS

A plurality of exemplary embodiments of a hydrostatic drive according to the disclosure are explained below with reference to drawings, in which.

DETAILED DESCRIPTION

The concept according to the disclosure can be used, in particular, in hydrostatically driven machines with a closed circuit, wherein application is concentrated on rotational drives, for example traction drives, winch drives or belt drives.

Figure 1:
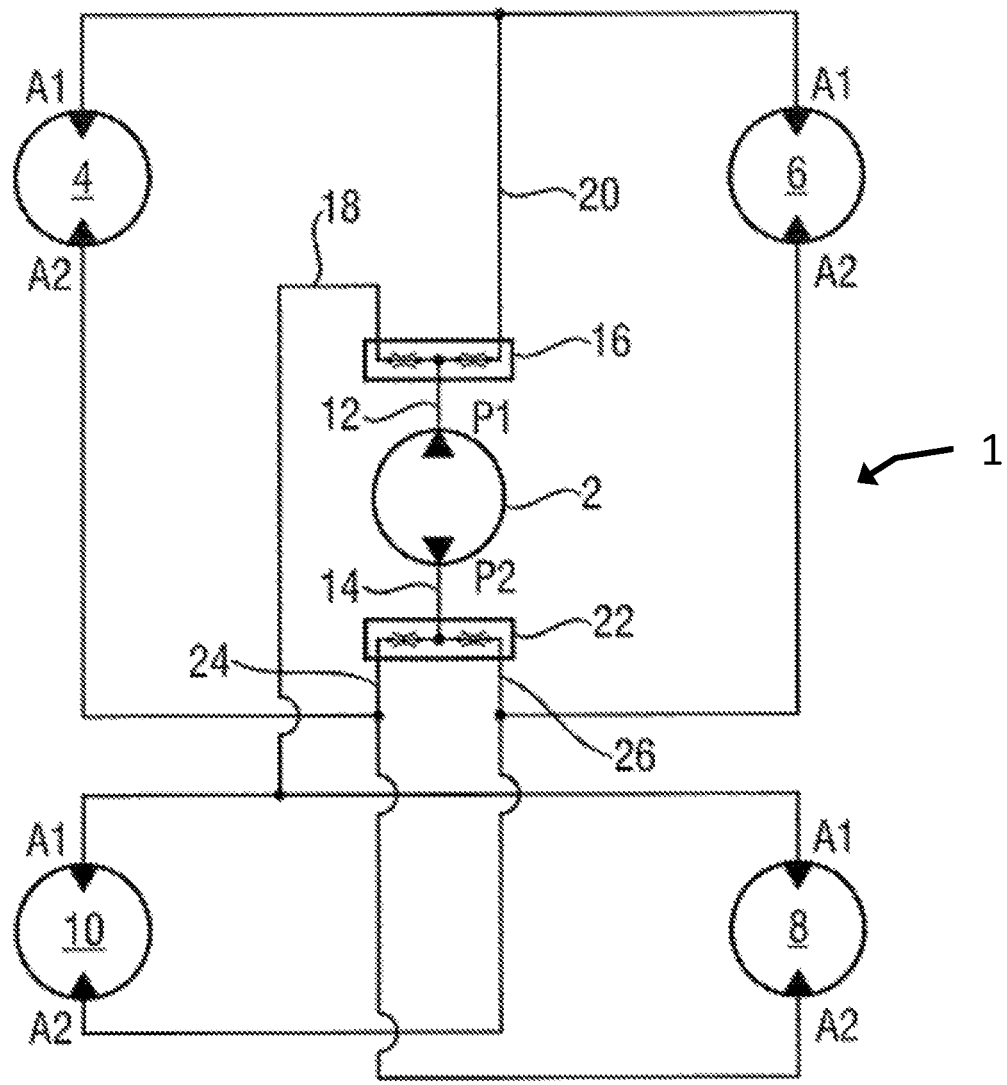
FIG. 1 shows a circuit diagram of a hydrostatic drive according to a first exemplary embodiment.

According to FIG. 1, a hydrostatic drive 1 has a pressure medium source in the form of a hydraulic pump 2 by means of which four hydraulic motors 4, 6, 8 and 10 can be driven. The drive 1 is embodied as a traction drive for a vehicle, for which reason a respective hydraulic motor 4 to 10 can drive a wheel. The hydraulic motors 4 and 6 which are at the top in FIG. 1 are arranged here on a first axle, and the lower hydraulic motors 8 and 10 are arranged on a second axle of the vehicle. The hydraulic pump 2 forms, together with the hydraulic motors 4 to 10, a closed hydraulic circuit, wherein pressure medium can be delivered in two directions with the hydraulic pump 2.

The hydraulic pump 2 has a first and a second pump port P1 and P2, wherein a pump line 12 or 14 is respectively connected to the latter. The pump line 12 is connected to a first flow divider 16 which, divides a pressure medium volume flow into identical or different partial volume flows according to a predetermined ratio, or adds together partial volume flows, depending on the direction of flow through the flow divider 16. A configuration of the flow divider 16 is explained in more detail below.

Two working lines 18, 20 which conduct the partial volume flows are connected to the flow divider 16. The working line 18 branches and is connected to a working port A1 of a respective hydraulic motor 8 and 10, at the bottom in FIG. 1. The branching working line 20 is in turn connected to a working port A1 of a respective hydraulic motor 4 and 6, at the top in FIG. 1. The further pump line 14 is also connected to a flow divider 22 to which two working lines 24 and 26, which also conduct partial volume flows, are also connected in accordance with the first flow divider 16. The branching working line 24, the one on the left in FIG. 1, is then connected to a working port A2 of the hydraulic motor 4, which is top left in FIG. 1, and hydraulic motor 8, which is bottom right. In contrast, the branching working line 26, the one on the right in FIG. 1, is connected to a working port A2 of the hydraulic motor 6, which is top right in FIG. 1, and hydraulic motor 10, which is bottom left. A respective hydraulic motor 4 to 10 therefore shares its working line 18 or 20, connected to its working port A1, with one of the hydraulic motors 4 to 10, and its working line 24 or 26, connected to its working port A2, with, in each case, another hydraulic motor 4 to 10.

The flow dividers 16 and 22 ensure that a given pressure medium volume flow flows independently of the load pressure into desired partial quantities via the hydraulic motors 4 to 10 which are arranged parallel to one another. If the pressure medium volume flow is configured in such a way that, for example, the flow divider 16 is arranged downstream of the hydraulic pump 2, and the flow divider 22 is arranged upstream, the dividing operating state is referred to with respect to the flow divider 16, and the adding operating state is referred to with respect to the flow divider 22. If the pressure medium volume flow is directed conversely, the adding operating state would be referred to with respect to the flow divider 16, and the dividing operating state would be referred to with respect to the flow divider 22.

Such flow dividers are sufficiently known from the prior art and correspond, for example, to a load-pressure-independent flow distribution controller. This is disclosed, for example, in DE 10 2005 005 555 A1, DE 195 31 397 A1, DE 34 01 754 C2 and DE 31 17 815 A1, for which reason reference is made to the prior art for further information regarding the method of functioning and refinements of such flow dividers 16 and 22. Alternatively it is conceivable to use a hydraulic external gear machine as a flow divider, wherein working spaces which are bounded by two meshing gears of the external gear machine share an inflow port or outflow port and then have a different outflow port or inflow port.

It will be assumed that during use of the hydrostatic drive 1 in FIG. 1, pressure medium is delivered into the pump line 12 by the hydraulic pump 2. The hydraulic pump could also deliver pressure medium into the other pump line 14. The pressure medium volume flow is divided in the first flow divider 16 into approximately two equal partial volume flows. The first partial volume flow is delivered via the working line 18 to the two hydraulic motors 8 and 10 which are at the bottom in FIG. 1, and the other second partial volume flow is delivered via the working line 20 to the upper hydraulic motors 4 and 6. A respective partial volume flow is therefore again divided uniformly between, in each case, two hydraulic motors 8, 10 or 4, 6, respectively. The portion of the partial volume flow which flows via the hydraulic motor 4 and via the hydraulic motor 8, which are arranged diagonally, is combined again by the working line 24 and fed to the flow divider 22, which operates in the adding operating state. Furthermore, the portion of the partial volume flow which is delivered via the hydraulic motor 6 and via the motor 10 which is arranged diagonally with respect thereto is fed via the working line 26 to the other port of the flow divider 22 which in turn combines the combined partial flows in the working lines 24 and 26 to form a common pressure medium volume flow which is fed again via the pump line 14 to the hydraulic pump 2. The flow divider 16, which operates in the dividing operating state, and the flow divider 22, which operates in the adding operating state, therefore ensure that the partial volume flows in the working lines 18, 20, 24 and 26 remain the same irrespective of the load pressure.

If slip occurs, for example, at the wheel which is driven by the hydraulic motor which is top right in FIG. 1, as a result of the configuration of the drive 1 this does not lead to a situation in which the hydraulic motor 6 spins and sucks the entire partial volume flow of the working line 20, but instead as a result of the flow dividers 16 and 22 the partial volume flows in the working lines 18, 20, 24 and 26 remain substantially constant, which makes the portion of the partial volume flow downstream of the hydraulic motor 4 also remain constant and therefore also the portion of the partial volume flow of the working line 20 which occurs in said hydraulic motor 4.

In addition to the prevention of spinning of a hydraulic motor which drives a wheel with slip, the refinement of the hydrostatic drive 1 also leads to a situation in which traction can be at least for the most part maintained despite slipping of at least one wheel driven by the drive. If, for example, a load pressure in the normal operating state of the hydrostatic drive in the working lines 18 and 20 is 150 bar, and in the working lines 24 and 26 it is 25 bar, and for example the wheel which is driven by the hydraulic motor 6 loses grip, as a result of which it slips, the pressure in the working line 26 which is connected on the outlet side to the hydraulic motor 6 also increases to 150 bar, as a result of which a pressure of 300 bar occurs in the working line 18 owing to the flow dividers 16 and 22, which, in the case of the drive 1 from FIG. 1 corresponds to the maximum load pressure which is limited, for example, by pressure limiting valves. As a result of the hydrostatic drive according to the disclosure, traction of one or two wheels is completely maintained if the load pressure in the normal operating mode is less than or equal to 50% of the maximum load pressure. If the load pressure in the normal operating mode exceeds half the maximum load pressure, the maintained traction drops correspondingly in the case of slipping of one or two wheels.

In addition to the delivery direction, explained above, of the hydraulic pump 2 from the pump line 14 to the pump line 12, the inverted delivery direction is also possible, as a result of which the flow divider 22 then operates in the dividing operating state, and the flow divider 16 operates in the adding operating state.

Figure 2:
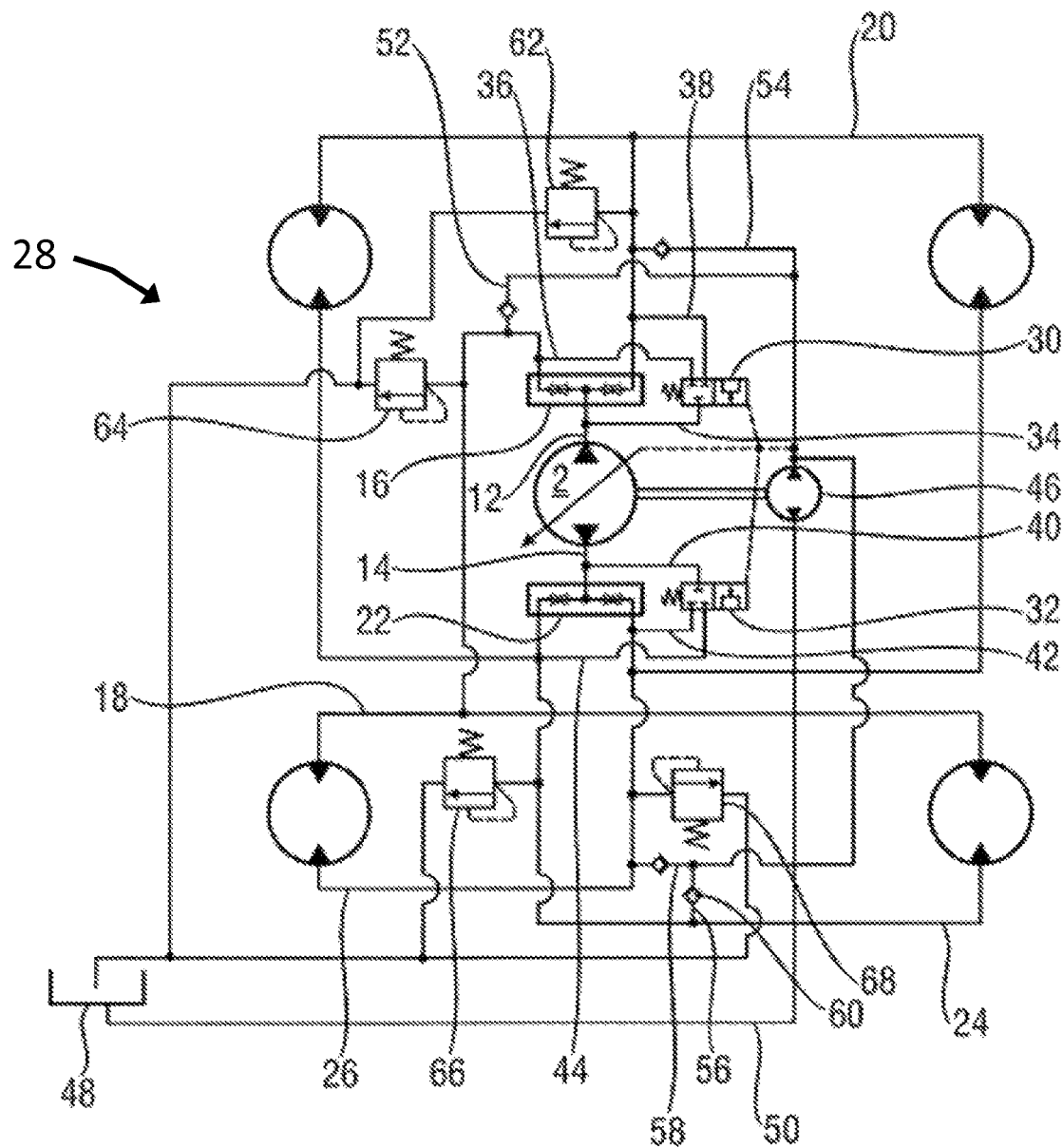
FIG. 2 shows a circuit diagram of the hydrostatic drive according to a second exemplary embodiment.

The hydrostatic drive 28 according to FIG. 2 in a second exemplary embodiment additionally has two bypass valves 30, 32 which are each arranged parallel to a respective flow divider 16 or 22. The bypass valves 30, 32 are configured as 3/2-way valves. The directional control valve 30 at the top in FIG. 2 is connected via a first bypass line 34 to the pump line 12 and, in each case, via bypass lines 36 and 38 to the working line 18 or 20. The bypass valve 32 is connected via a bypass line 40 to the pump line 14, and via bypass lines 42 and 44 to the working lines 26 or 24. A valve slider of a respective bypass valve 30 and 32 is biased by means of a valve spring into its closed position in which the bypass lines 34, 36 and 38 or 40, 42 and 44 of a respective bypass valve 30 or 32 are fluidically disconnected from one another. The valve slider of the respective bypass valve 30 and 32 can be displaced with a control pressure counter to the spring force of the valve spring into its open position in which the bypass line 34 is connected to the bypass lines 36 and 38 of the bypass valve 30, and the bypass line 40 is connected to the bypass lines 42 and 44 of the bypass valve 32.

Furthermore, the hydrostatic drive 28 in FIG. 2 has a feed pump 46 which is driven by the hydraulic pump 2 and by means of which pressure medium can be delivered from a tank 48 into feed lines 52, 54, 56 and 58 via a tank line 50 which is connected to the feed pump 46, which feed lines 52, 54, 56 and 58 are in turn connected to a respective working line 18, 20, 24 or 26. In a respective feed line 52, 54, 56 or 58, a replenishing valve 60 which is embodied as a nonreturn valve and which opens in the pressure medium flow direction away from the feed pump 46 is arranged, wherein for the sake of simplicity only the replenishing valve 60 of the feed line 58 is provided with a reference symbol in FIG. 2. The control pressure for the bypass valves 30 and 32 is tapped by the feed lines 52 to 58 between the replenishing valves 60 and the feed pump 46. Furthermore, an adjustment pressure for an adjustment unit of the hydraulic pump 2 is conventionally tapped from the feed lines 52 to 58 between the replenishing valve 60 and the feed pump 46.

A pressure line with a pressure limiting valve 62, 64, 66 and 68 for limiting a maximum load pressure branches off from a respective working line 18, 20, 24 or 26, wherein a pressure medium connection to the tank 48 can be opened with a respective pressure limiting valve 62 to 68.

The bypass valve is controlled as a function of a motor speed of the motor which drives the hydraulic pump 2. For example, the spring force of a respective valve spring of the bypass valve 30 or 32 is selected such that the valve slider of the bypass valve 30 or 32 opens at approximately half the maximum engine speed of the engine which drives the hydraulic pump 2.

By means of the bypass valves 30 and 32, the flow dividers 16 and 22 can therefore be bypassed, as a result of which an anti-slip function of the drive 28 is switched off and a differential lock is switched on.

Figure 3:
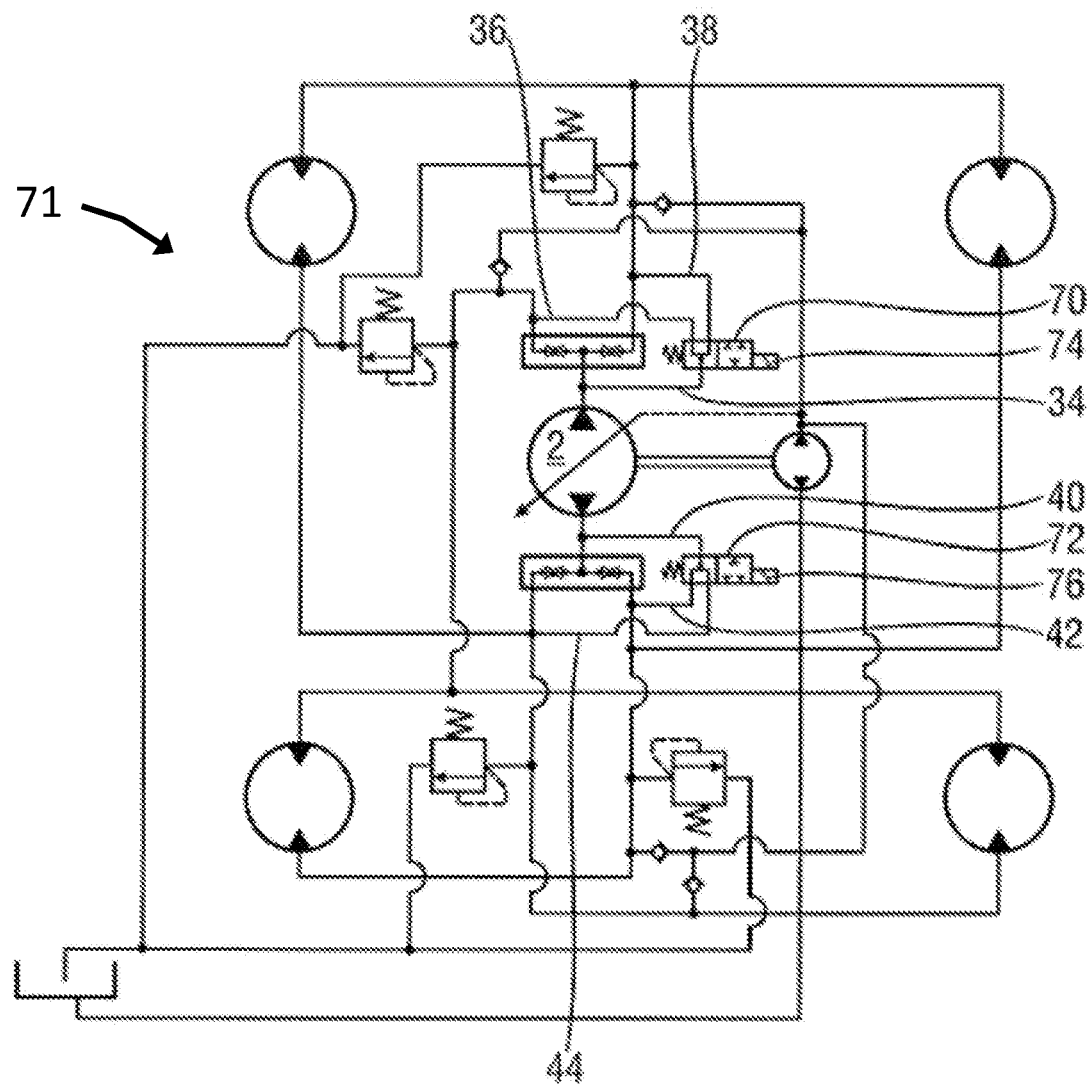
FIG. 3 shows a circuit diagram of the hydrostatic drive according to a third exemplary embodiment.

In FIG. 3, the hydrostatic drive 71 has, according to a third exemplary embodiment, bypass valves 70 and 72 which are configured differently compared to the drive 28 in FIG. 2. A valve slider of the bypass valves 70 or 72 is biased here by means of a spring force of a valve spring into an open position in which the bypass line 34 is connected to the bypass lines 36 and 38, and respectively the bypass line 40 is connected to the bypass lines 42 and 44. In a closed position, the valve slider of a respective bypass valve 70 or 72 cannot be displaced by means of a control pressure, as in the case of the drive 28 from FIG. 2, but rather by means of an electric actuator 74 or 76. If the valve slider of a respective bypass valve 70 or 72 is in its closed position, the differential lock of the drive 71 is activated. The actuators 74 and 76 can be controlled electrically by a common switch which can be arranged, for example, underneath a gas pedal of the engine, in particular an internal combustion engine, which drives the hydraulic pump 2. As a result, starting from a specific pivoting angle of the gas pedal the electric switch is activated and the actuators 74 and 76 can as a result be activated or deactivated depending on the intended use. Given activation of the actuators 74 and 76, the valve slider of the bypass valves 70 or 72 is displaced into its closed position counter to the spring force of the valve spring which is assigned to it. Furthermore, alternatively or additionally a switch can be arranged on a steering cylinder of a steering system of a vehicle which has the drive 71, as a result of which given a specific steering lock the switch is activated and as a result the actuators 74 and 76 can in turn be activated or deactivated.

The drive according to the disclosure gives rise to a slip performance which is similar to the document EP 0 547 947 B1 mentioned at the beginning.

A hydrostatic drive having a hydraulic pump with which at least two hydraulic motors can be driven is disclosed. The hydraulic motors are each connected here on the inlet side to a respective outlet of a flow divider, which is arranged downstream of the hydraulic pump, and are each connected on the outlet side to a respective inlet of a flow divider, which is arranged upstream of the hydraulic pump.

What is claimed is:

1. A hydrostatic drive comprising:
 a hydraulic pump having an inlet and an outlet;
 at least three hydraulic motors configured to be driven by the hydraulic pump;
 a first flow divider that is arranged downstream of the hydraulic pump, and that has an inlet connected to the outlet of the hydraulic pump, a first outlet, and a second outlet;
 a second flow divider that is arranged upstream of the hydraulic pump, and that has a first inlet, a second inlet, and an outlet connected to the inlet of the hydraulic pump, wherein:
 a first hydraulic motor of the at least three hydraulic motors has:
  an inlet side connected to the first outlet of the first flow divider; and
  an outlet side connected to the first inlet of the second flow divider;
 a second hydraulic motor of the at least three hydraulic motors has:
  an inlet side connected to the first outlet of the first flow divider; and
  an outlet side connected to the second inlet of the second flow divider; and
 a third hydraulic motor of the at least three hydraulic motors has:
  an inlet side connected to the second outlet of the first flow divider; and
  an outlet side connected to the first inlet of the second flow divider.

2. The hydrostatic drive according to claim 1, further comprising a plurality of pressure limiting valves configured to open into a tank, such that:

for each hydraulic motor connected to the first flow divider, a respective pressure limiting valve is connected between the hydraulic motor and a corresponding outlet of the first flow divider; and for each hydraulic motor connected to the second flow divider, a respective pressure limiting valve is connected between the hydraulic motor and a corresponding inlet of the second flow divider.

3. The hydrostatic drive according to claim 1, further comprising:
a feed pump;
a plurality of replenishing valves configured to open in a pressure medium flow direction away from the feed pump; and
a plurality of feed lines each connected to the feed pump via a respective replenishing valve, such that:
for each hydraulic motor connected to the first flow divider, a respective feed line is connected on one end to a corresponding replenishing valve, and on another end between the hydraulic motor and a corresponding outlet of the first flow divider; and
for each hydraulic motor connected to the second flow divider, a respective pressure limiting valve is connected on one end to a corresponding replenishing valve, and on another end between the hydraulic motor and a corresponding inlet of the second flow divider.

4. The hydrostatic drive according to claim 3, further comprising:
at least one bypass valve configured to control a pressure medium connection between the at least three hydraulic motors and the hydraulic pump, each bypass valve arranged parallel to a respective flow divider.

5. The hydrostatic drive according to claim 4, wherein the at least one bypass valve includes a valve slider configured to be acted on in a first direction of an open position by a pressure between the replenishing valves and the feed pump and configured to be acted on in a second direction of a closed position by a spring force of a valve spring.

6. The hydrostatic drive according to claim 4, wherein the at least one bypass valve includes a valve slider configured to be acted on in a first direction of a closed position with an adjustment force by an electric actuator and configured to be acted on in a second direction of an open position by a spring force of a valve spring.

7. The hydrostatic drive according to claim 6, further comprising:
a switch configured to activate or deactivate the electric actuator by a pivoting angle of a gas pedal of an engine which drives the hydraulic pump or by a pivoting angle of a steering cylinder of a steering system of a vehicle which has the hydrostatic drive.

8. The hydrostatic drive according to claim 1, wherein at least one of the first flow divider and the second flow divider is one of a hydraulic flow dividing valve, a hydraulic external gear machine, and a load-pressure-independent flow distribution controller.

9. The hydrostatic drive according to claim 1, wherein:
the hydrostatic drive is a traction drive; and
a respective hydraulic motor is connected to a respective wheel of the traction drive.

10. The hydrostatic drive according to claim 1, wherein the hydraulic pump is pivotable configured to pivot in order to reverse a direction of rotation of the hydraulic motors.

11. The hydrostatic drive according to claim 1, further comprising a fourth hydraulic motor that is configured to be driven by the hydraulic pump, and that includes:
an inlet side that is connected to the second outlet of the first flow divider; and
an outlet side that is connected to the second inlet of the second flow divider.

12. The hydrostatic drive according to claim 11, further comprising a plurality of pressure limiting valves configured to open into a tank, such that:
for each hydraulic motor connected to the first flow divider, a respective pressure limiting valve is connected between the hydraulic motor and a corresponding outlet of the first flow divider; and
for each hydraulic motor connected to the second flow divider, a respective pressure limiting valve is connected between the hydraulic motor and a corresponding inlet of the second flow divider.

13. The hydrostatic drive according to claim 11, further comprising:
a feed pump;
a plurality of replenishing valves configured to open in a pressure medium flow direction away from the feed pump; and
a plurality of feed lines each connected to the feed pump via a respective replenishing valve, such that:
for each hydraulic motor connected to the first flow divider, a respective feed line is connected on one end to a corresponding replenishing valve, and on another end between the hydraulic motor and a corresponding outlet of the first flow divider; and
for each hydraulic motor connected to the second flow divider, a respective pressure limiting valve is connected on one end to a corresponding replenishing valve, and on another end between the hydraulic motor and a corresponding inlet of the second flow divider.

14. The hydrostatic drive according to claim 11, further comprising:
at least one bypass valve configured to control a pressure medium connection between the at least three hydraulic motors and the hydraulic pump, each bypass valve arranged parallel to a respective flow divider.

15. The hydrostatic drive according to claim 11, wherein at least one of the first flow divider and the second flow divider is one of a hydraulic flow dividing valve, a hydraulic external gear machine, and a load-pressure-independent flow distribution controller.

16. The hydrostatic drive according to claim 11, wherein:
the hydrostatic drive is a traction drive; and
each of the at least three hydraulic motors is connected to a respective wheel of the traction drive.

17. The hydrostatic drive according to claim 1, further comprising:
at least one bypass valve configured to control a pressure medium connection between the at least three hydraulic motors and the hydraulic pump, each bypass valve arranged parallel to a respective flow divider.

* * * * *